(12) United States Patent
Agier et al.

(10) Patent No.: US 8,997,971 B2
(45) Date of Patent: Apr. 7, 2015

(54) POSTAL SORTING MACHINE FOR SORTING FLAT ARTICLES WITH A SEPARATION FLAP

(71) Applicant: Solystic, Gentilly Cedex (FR)

(72) Inventors: Francois Agier, Bourg les Valence (FR); Damien Berliet, Bourg les Valence (FR); Emmanuel Delbe, Guilherand Grange (FR); Olivier De Sousa, Montmeyran (FR)

(73) Assignee: Solystic, Gentilly Cedex (FR)

( * ) Notice: Subject to any disclaimer, the term of this patent is extended or adjusted under 35 U.S.C. 154(b) by 0 days.

(21) Appl. No.: 13/980,814

(22) PCT Filed: Oct. 23, 2012

(86) PCT No.: PCT/FR2012/052424
§ 371 (c)(1),
(2) Date: Jul. 19, 2013

(87) PCT Pub. No.: WO2013/088008
PCT Pub. Date: Jun. 20, 2013

(65) Prior Publication Data
US 2014/0048385 A1    Feb. 20, 2014

(30) Foreign Application Priority Data

Dec. 13, 2011  (FR) ...................... 11 61560

(51) Int. Cl.
*B65G 47/46*  (2006.01)
*B07C 3/06*  (2006.01)
*B65H 29/58*  (2006.01)

(52) U.S. Cl.
CPC ............... *B65G 47/46* (2013.01); *B07C 3/065* (2013.01); *B65H 29/58* (2013.01); *B65H 2301/321* (2013.01); *B65H 2404/632* (2013.01); *B65H 2701/1916* (2013.01); *B65H 2301/44316* (2013.01); *Y10S 209/90* (2013.01)

(58) Field of Classification Search
USPC ............. 198/367–367.2; 271/2, 303; 209/900
See application file for complete search history.

(56) References Cited

U.S. PATENT DOCUMENTS 4,149,248 A * 4/1979 Pavkovich ...................... 378/14
5,542,547 A * 8/1996 Ricciardi ...................... 209/539
(Continued)

FOREIGN PATENT DOCUMENTS

| EP | 2206564 A1 | 7/2010 |
|---|---|---|
| JP | 59-048352 A | 3/1984 |
| WO | 9810876 A1 | 3/1998 |

OTHER PUBLICATIONS

International Search Report; Feb. 12, 2013; PCT/FR2012/052424.
(Continued)

*Primary Examiner* — Mark A Deuble
(74) *Attorney, Agent, or Firm* — Patterson & Sheridan, L.L.P.

(57) ABSTRACT

A postal sorting machine for flat articles on edge, said machine comprising first belt conveyor means suitable for conveying said flat articles along a first path, a plurality of sorting outlets, each of which is associated with a separator flap mounted to move about a pivot axis between a first position in which it does not interfere with said first path and a second position in which it intersects said first path so as to direct said flat articles along a second path, said separator flap being suspended by a pivot rod extending on one side of said flap only, so that the zone under said separator flap is left free.

16 Claims, 3 Drawing Sheets

(56) References Cited

U.S. PATENT DOCUMENTS

| | | | |
|---|---|---|---|
| 5,979,891 A * | 11/1999 | Roux | 271/225 |
| 6,533,271 B1 | 3/2003 | Zimmermann | |
| 6,666,324 B2 * | 12/2003 | Engarto et al. | 198/447 |
| 6,840,384 B2 * | 1/2005 | Yurko | 209/652 |
| 7,029,002 B2 * | 4/2006 | Engarto et al. | 271/2 |
| 7,441,770 B2 * | 10/2008 | Eyraud et al. | 271/198 |
| 8,002,118 B2 * | 8/2011 | Tratar et al. | 209/657 |
| 8,757,352 B1 * | 6/2014 | Daboub et al. | 198/367 |
| 2010/0038848 A1 * | 2/2010 | Tratar et al. | 271/303 |
| 2010/0282571 A1 * | 11/2010 | Schimmel et al. | 198/367 |
| 2011/0203903 A1 | 8/2011 | Zimmermann | |

OTHER PUBLICATIONS

Search Report (INPI, French Patent Office); Jun. 8, 2012; FR 1161560.

* cited by examiner

POSTAL SORTING MACHINE FOR SORTING FLAT ARTICLES WITH A SEPARATION FLAP

TECHNICAL FIELD

The invention relates in general to a postal sorting machine for flat articles on edge, said machine comprising a frame carrying at least first belt conveyor means suitable for conveying the flat articles along a first path, at least one separator flap mounted to move about a pivot axis between a first position in which it does not interfere with the first path and a second position in which it intersects the first path so as to direct the flat articles along a second path.

In the meaning of the invention, a "flat article" means, particularly but not exclusively, a mailpiece. Mailpieces that are suitable for being sorted using the postal sorting machine of the invention may be of various sizes, and they may also have a variety of mechanical characteristics, in particular as regards stiffness. Such a mailpiece may, inter alia, be an ordinary letter, a magazine, an envelope with or without a window, a newspaper, or indeed a catalogue wrapped in plastic or in paper, with or without gussets.

PRIOR ART

In known manner, such a postal sorting machine has a feed inlet with a magazine for flat articles, and an unstacker for putting the flat articles in series and on edge, the flat articles then being conveyed towards an address acquisition system, and then being directed by a separator flap towards sorting outlets that are aligned side-by-side, and that are, in particular, equipped with stackers. Conventionally, a separator flap, such as a flap of the invention, is placed immediately upstream from the stacker of the corresponding outlet. However, the separator flap of the invention may be placed at other places of the sorting machine, in particular if said sorting machine has a plurality of outlet zones situated one below another. In such a situation, the separator flap makes it possible to direct the flat articles towards one or another of these superposed output zones.

Publication U.S. Pat. No. 6,533,271 describes a flat article sorting machine having four belts disposed in parallel planes, including first and second belts that face each other in the portion upstream from the separator flap so as to transport the flat articles along a main path by nipping them. The first and second belts diverge upstream from the bifurcation embodied by a bifurcation pulley, so as to enable a third belt and a fourth belt to be received between them, the third belt being disposed facing the first belt so as to enable the flat articles to be transported along the main path by being nipped between the first and third belts, and the fourth belt being disposed facing the second belt so as to enable the flat articles to be transported along a secondary path that is different from the main path by being nipped between the fourth and second belts. The separator flap is of a twin flap type mounted to pivot about the axis of the bifurcation pulley so that, for example, the flat articles are steered towards sorting outlets. This twin separator flap points in a direction such that its pivot axis is upstream from the vanes in the direction in which the flat articles are conveyed. This twin separator is made up of two paddles provided on either side of the path of the flat articles, and in planes perpendicular to the direction of movement of the flat articles. By being pivoting, that separator flap makes it possible to steer the flat articles, downstream from the bifurcation, either in the main direction, or in the secondary direction. The configuration of that separator flap whereby the free end of the vane is close to all four belts accentuates the risks of flat articles jamming. In addition, since the vane is situated downstream from the pivot axis, it is difficult for the separator flap to overcome the inertia of heavy flat articles, and it might then be forced to pivot and to allow certain flat articles to be transported along the wrong path. Finally, the pivot axis of the pivotally mounted flap is necessarily at some distance from the path of the flat articles, thereby increasing the risks of jamming. In addition, that separator flap does not allow a foot belt to be used for receiving the edges of the flat articles being transported and thereby enabling them to be transported more reliably.

Publication US 2011/0203903 also discloses a flat article sorting machine that is substantially similar to the above-described sorting machine. It differs in particular by its separator flap that has a single vane and points towards the downstream ends of the belts, the vane thus being disposed upstream from the pivot axis relative to the direction in which the flat articles are conveyed. In addition, the separator flap carries the axis of a pulley guiding the third belt, which pulley axis is offset relative to the pivot axis of the separator flap towards the free end of the vane. Thus, when the separator flap pivots to direct a downstream flat article, the pulley axis is offset in such a manner as to narrow the nip zone formed by the first and third belts on either side of an upstream flat article. In its pivoted position, the separator flap overlaps the first belt. Thus, in order to allow this position to be used, the separator flap has a rectangular cutout suitable for receiving the first belt so that it can pass through without any friction. Unfortunately, it is frequent for flat articles, in particular when they are floppy, to deform and to find themselves slowed down or wedged by said notch, thereby causing a jam. In addition, that separator flap does not allow a foot belt to be used for receiving the edges of the flat articles being transported and thereby enabling them to be transported more reliably.

SUMMARY OF THE INVENTION

An object of the invention is to remedy those drawbacks by proposing a postal sorting machine for flat articles that has a separator flap, making it possible for the flat articles to be transported reliably with limited risks of the flat articles becoming jammed and damaged, guiding them effectively at a bifurcation between a first path and a second path while limiting the risks of the flat articles being blocked or jammed, in particular at said bifurcation.

To this end, the invention provides a postal sorting machine for flat articles on edge, said machine comprising a frame carrying at least first belt conveyor means suitable for conveying said flat articles along a first path, at least one separator flap mounted to move about a pivot axis between a first position in which it does not interfere with the first path and a second position in which it intersects the first path so as to direct the flat articles along a second path, said postal sorting machine being characterized in that the separator flap comprises a vane secured to or integral with a pivot rod, which pivot rod defines the pivot axis, and extends on one side of the flap only and is fastened to the frame so that the pivot flap is suspended by the pivot rod while the zone under the separator flap is left free.

The basic idea of the invention is to provide a separator flap that is suitable for being suspended so as to free up the zone below its pivot axis so as to enable a foot belt to pass through said zone. Flat articles can thus not only have their faces nipped between two belts, but also have their edges carried by a foot belt and be directed at the bifurcation by a separator flap having its pivot axis disposed in the immediate vicinity of the belts. Thus, the zones in which the flat articles are not guided are limited, thereby reducing the risks of jamming accordingly.

The postal sorting machine of the invention may advantageously have the following features:

the separator flap is provided with at least one notch extending from the free edge of the separator flap that is opposite from the pivot axis towards the pivot axis and designed, when the separator flap is in at least one of the first and second positions, to receive at least one belt of the first conveyor means so that the belt passes through it without any friction;

the notch in the separator flap has at least one slanting side disposed facing the pivot axis and having its end that points towards the pivot rod further away from the pivot axis than its opposite end that points towards the side of the vane that is free of the pivot rod;

in a midplane of the separator flap that contains the pivot axis and the free edge, the slanting side is inclined relative to the pivot axis at a first angle lying in the range 15° to 45°, and preferably substantially equal to 30°;

in a transverse plane of the separator flap that is substantially perpendicular to the midplane, the slanting side defines first and second slide surfaces that are disposed in a V-shaped configuration relative to each other, the tip of the V-shape pointing away from the pivot axis, the first and second slide surfaces being substantially plane and inclined relative to the midplane respectively at a first slide angle lying in the range 10° to 50° and preferably substantially equal to 30°, and at a second slide angle lying in the range 20° to 55° and preferably substantially equal to 42°;

the notch in the separator flap is offset on the vane, along the free edge so as to define a blade and a prong separated by the notch, the free end of the prong extending beyond the free edge of the blade, and the outer edge of the prong that faces away from the notch being inclined at least in part at a third angle relative to the pivot axis so that the prong thickens going from its free tip towards its base;

in the midplane of the separator flap that contains the pivot axis and the free edge, the vane is rectangular in overall shape, and, in a transverse plane that is substantially perpendicular to the midplane, the separator flap has a profile that is triangular in overall shape, tapering towards the free edge;

the first conveyor means comprise at least one main belt and a foot belt that are separated from each other, in a direction that is substantially parallel to the pivot axis, by a predetermined distance arranged to allow the prong to pass without any friction between the foot belt and the main belt while the separator flap is pivoting towards the second position;

the separator flap is provided with at least one through detection orifice allowing detection means to pass through that are suitable for detecting a jam of flat articles behind the separator flap, at least when the flap is in its first position; and the postal sorting machine may further comprise motor-drive means for driving the separator flap, which motor-drive means are carried by the frame.

BRIEF DESCRIPTION OF THE DRAWINGS

The present invention can be better understood and other advantages appear on reading the following detailed description of an embodiment given by way of non-limiting example and with reference to the accompanying drawings, in which.

DESCRIPTION OF THE EMBODIMENTS

Figure 3:
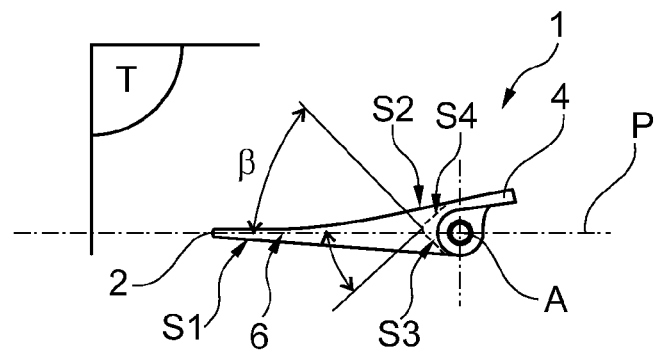
FIGS. 1 to 3 are views respectively in perspective, in elevation, and in plan showing a separator flap of a postal sorting machine of the invention.
Figure 1:
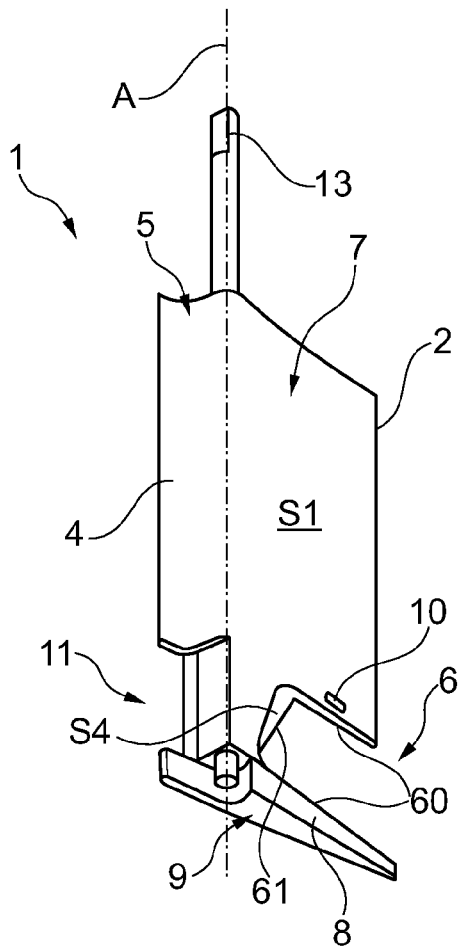
Figure 2:
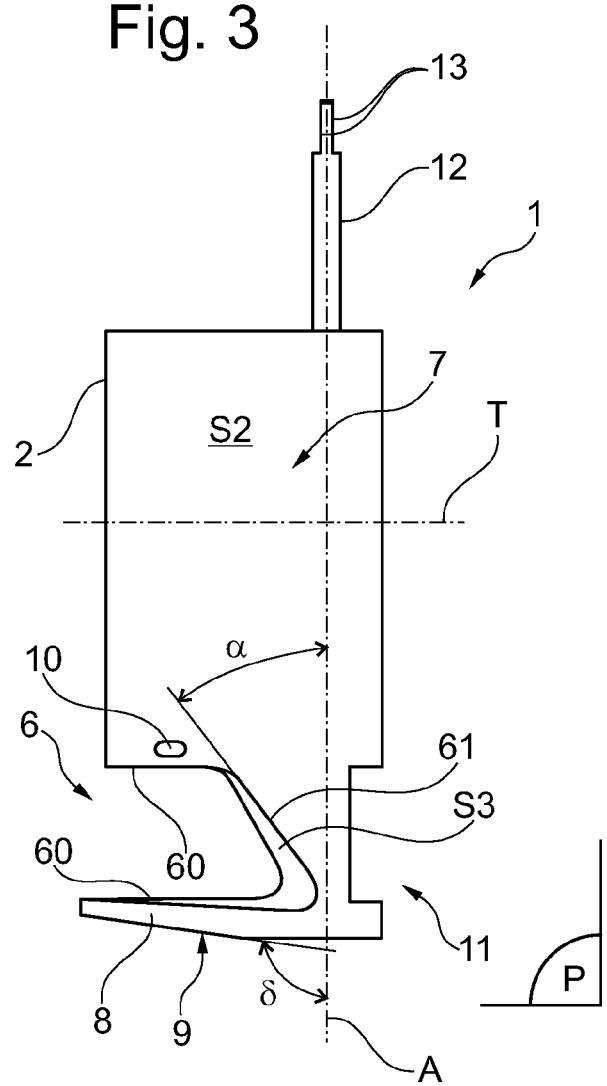

With reference in particular to FIGS. 1 to 3, the separator flap 1 of the invention comprises a vane that is rectangular in overall shape with a midplane P shown in FIG. 2. In a transverse plane T that is substantially perpendicular to the midplane P, the vane has a profile that is triangular in overall shape as shown in FIG. 3. The separator flap 1 is provided with a pivot axis A in the wide portion of the triangular profile, the triangular profile tapering towards a free edge 2 of the vane, opposite from pivot axis A. The midplane P contains the pivot axis A and the free edge 2 of the vane. The opposite faces of the vane define first and second guide surfaces S1, S2 for guiding flat objects to be conveyed. The vane is extended beyond the pivot axis A via a fin 4 making it possible to guarantee that the guiding provided by the second guide surface S2 is extended beyond the pivot axis A, and preserving an undercut 5 suitable for receiving other mechanical elements of the postal sorting machine that is described below. The vane is provided with a notch 6 opening out in the free edge 2 and extending towards the pivot axis A. The function of the notch 6 is described below. The notch 6 is in the general shape of a trapezoid having one side formed by the free edge 2 of the vane, two substantially parallel sides 60 extending from the free edge 2 perpendicularly to the pivot axis A, and a slanting side 61 that interconnects the ends of the two sides 60 and that forms a tip pointing towards the pivot axis A. The notch 6 may have any other suitable shape defining at least one slanting side facing the pivot axis A and inclined so that the end of the slanting side that points towards the pivot rod 12 (described below) is further away from the pivot axis A than the opposite end that points towards the side of the vane that is free of the pivot rod.

In the midplane P, the slanting side 61 of the notch 6 is inclined relative to the pivot axis A at a first angle $\alpha$ (visible in FIG. 2) lying in the range 15° to 45°, and preferably substantially equal to 30°. In addition, in the thickness of the separator flap 1, the slanting side 61 of the notch 6 has first and second slide surfaces S3, S4 that are substantially plane, and that are disposed in a V-shaped configuration relative to each other, the tip of the V-shape pointing away from the pivot axis. The first slide surface S3 is inclined relative to the midplane P, in the transverse plane T, at a first slide angle $\epsilon$ lying in the range 10° to 50°, and preferably substantially equal to 30°. The second slide surface S4 is inclined relative to the midplane P, in the transverse plane T, at a second slide angle $\beta$ lying in the range 20° to 55°, and preferably substantially equal to 42°.

The notch 6 is offset on the vane, along the free edge 2, so as to define a blade 7 and a prong 8 separated by a notch 6. The length of vane at the prong 8 is greater than the length of vane at the blade 7. Thus, the free end of the prong 8 extends beyond the free edge 2 defining the blade 7. In addition, the outer edge 9 of the prong 8 that faces away from the notch 6 is inclined relative to the pivot axis A at a third angle δ (visible in FIG. 2) lying in the range 92° to 115°, and preferably equal to 97°. Thus, the prong 8 thickens going from its free tip towards its base situated close to the pivot axis A. The function of the prong 8 is described below. The flap is also provided with a through detection orifice 10 allowing detection means (not shown) to pass through, making it possible to detect any jamming of flat articles behind the separator flap 1. For example, these detection means comprise a beam which, on being interrupted for a prolonged period of time in the event of a jam, triggers an alarm. For example, this detection orifice 10 is of oblong shape in order to allow the separator flap 1 to pivot without interfering with the detection means in untimely manner. In register with the notch 6, the separator flap 1 is provided with a setback 11 suitable for receiving other mechanical elements of the postal sorting machine that is described below.

The separator flap 1 further comprises a pivot rod 12 extending in the midplane P, on one side of the vane only, and defining the pivot axis A. For example, the pivot rod 12 is cylindrical, one of its ends being provided with flats 13 facilitating connecting it, for example, to a motor suitable for causing the separator flap 1 to pivot.

For example, the separator flap 1 of the invention is used in a postal sorting machine 100 that is such as described below with reference to FIGS. 4 to 7, in which it is shown in fragmentary manner, and that can have a plurality of sorting outlets, each sorting outlet being associated with a respective separator flap 1.

The postal sorting machine 100 has first conveyor means coupled to first guide means for the purpose of moving flat articles E along a first path represented by arrows C1, and second conveyor means coupled to second guide means for the purpose of moving flat articles E along a second path represented by arrows C2 and diverging from the first path C1 at a bifurcation at which the postal sorting machine 100 is provided with a separator flap 1 as described above.

The first conveyor means include, in particular:
  a main belt 101 that is motor-driven, and that is carried by main pulleys 102 so that the active run of the main belt 101 in contact with the flat articles E extends substantially vertically;
  a first belt 103 (visible in FIGS. 6 and 7) that is motor-driven, that is carried by first pulleys 104, and that is suitable for co-operating with the main belt 101 to nip the flat articles E so as to transport them along the first path C1 upstream from and down to the bifurcation;
  a second belt 105 (visible in FIGS. 6 and 7) that is motor-driven, that is carried by second pulleys 106, and that is suitable for co-operating with the main belt 101 to nip the flat articles E so as to transport them along the first path C1 downstream from the bifurcation; and
  a foot belt 107 that is motor-driven, and that is carried by foot pulleys 108 (one of which is visible in FIGS. 4 and 5) so that at least the active run of the foot belt 107 that is in contact with the edges of the flat articles E standing on top of it extends substantially perpendicularly to the main belt 101, namely horizontally.

Figure 4:
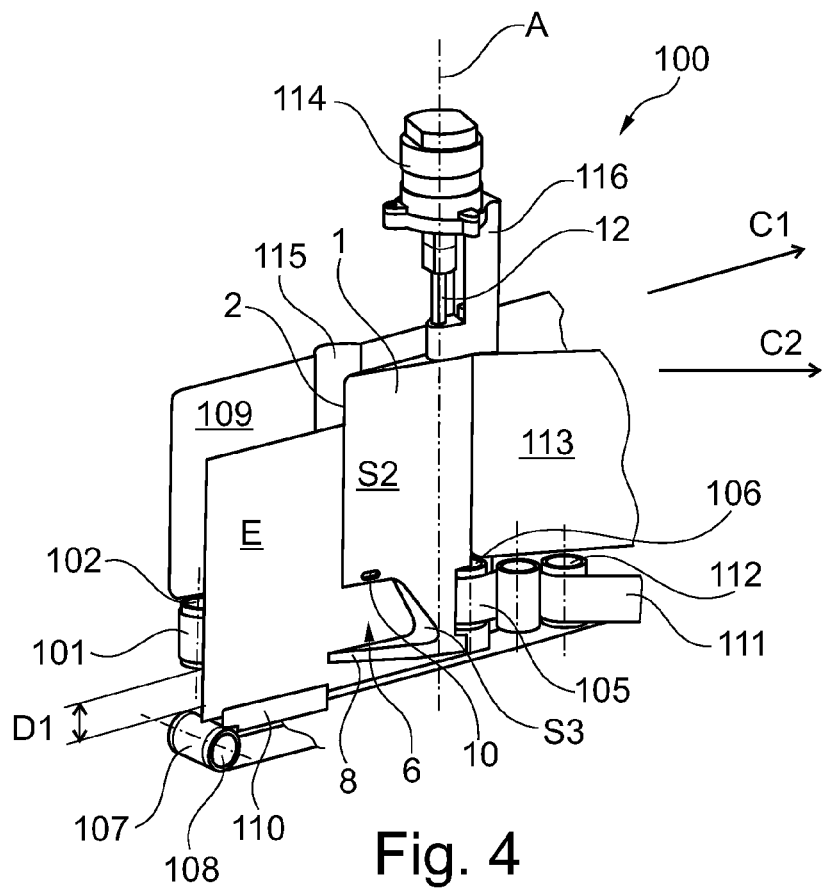
FIGS. 4 and 5 are fragmentary perspective views of a postal sorting machine of the invention, showing the separator flap respectively in its first position and in its second position, with a flat article traveling at the bifurcation between a main path and a secondary path.

As appears from FIG. 4, the setback 11 provided in the separator flap 1 behind the pivot axis A makes it possible to receive the upstream second pulley 106 so that the second belt 105 is in the immediate vicinity of the bifurcation so as to limit the zone in which the flat articles E are not driven by a belt on each of their faces.

The first guide means include, in particular, a first back plate 109 provided along and above the active run of the foot belt 107 for the purpose of guiding the flat articles E over the entire height of said flat articles. The first guide means also include a front guide 110 (visible in FIGS. 4 and 5) provided facing the back plate 109, on the other side of the passage for the flat articles E, for the purpose of guiding the feet of the flat articles E. The first guide means further include at least one first front guide plate (not shown) provided facing the first back plate 109 and a second front guide plate (not shown) provided facing the first belt 103. The main pulleys 102 and the foot pulleys 108 are mounted to move in rotation relative to a support such as a frame (not shown), and the back plate 109 and the front guide 110 are carried by the same frame. The first conveyor and guide means may naturally include any other suitable element.

The second conveyor means include, in particular:
  the above-described first belt 103 that, at the bifurcation, diverges from the main belt 101 along the second path C2; and
  a third belt 111 (visible in FIGS. 6 and 7) that is motor-driven, that is carried by third pulleys 112, and that is suitable for co-operating with the main belt 103 to nip the flat articles E so as to transport them along the second path C2 downstream from the bifurcation.

The second guide means include, in particular, a second back plate 113 provided along and above the active run of the third belt 111 for the purpose of guiding the flat articles E over the entire height of said flat articles. The second conveyor and guide means may naturally include any other suitable element.

The separator flap 1 is disposed facing the main belt 101, its pivot axis A being substantially vertical. The separator flap 1 is suspended via its pivot rod 12 from a support 116 carried by the frame. The support 116 also carries a motor 114 coupled to the pivot rod 12 and suitable for moving the separator flap 1 pivotally between a first position (shown in FIGS. 4 and 6) in which it does not interfere with the first path C1, and a second position (shown in FIGS. 5 and 7) in which it intersects the first path C1 so as to direct the flat articles E along the second path C2.

In the first position, the notch 6 of the separator flap 1 receives the first belt 103 so that said belt passes through it without any friction. In this first position, the flat articles E are conveyed and guided along the first path C1:
  before the bifurcation, by: the main belt 101; the foot belt 107; the first belt 103; the front guide 110; the first front guide plate; the first back plate 109; and any other suitable guide element; and
  after the bifurcation, by: the main belt 101; the second belt 105; the first back plate 109; and any other suitable guide element.

In the second position, the notch 6 of the separator flap 1 receives the main belt 101 so that said belt passes through it without any friction. The first back plate 109 has a V-shape 115 suitable for receiving the separator flap 1 in its second position.

In this second position, the flat articles E are conveyed and guided along the second path C2:
  before the bifurcation, by: the main belt 101; the foot belt 107; the first belt 103; the front guide 110; the first front guide plate; the first back plate 109; and any other suitable guide element; and
  after the bifurcation, by: the main belt 103; the third belt 111; the second front guide plate 110; the second back plate 113; and any other suitable guide element.

Figure 5:
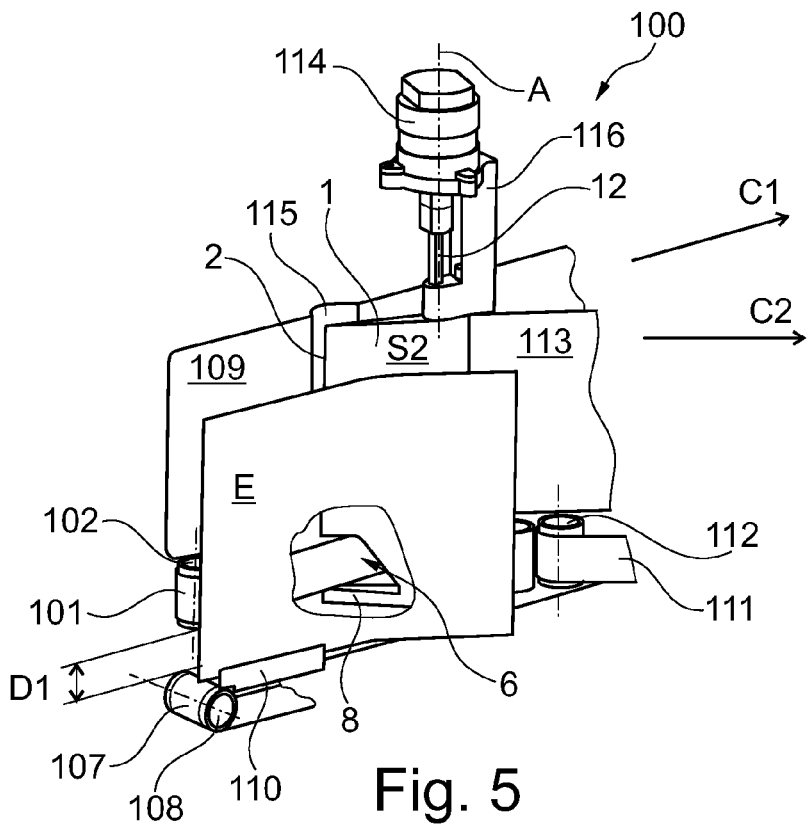
Figures 6, 7:
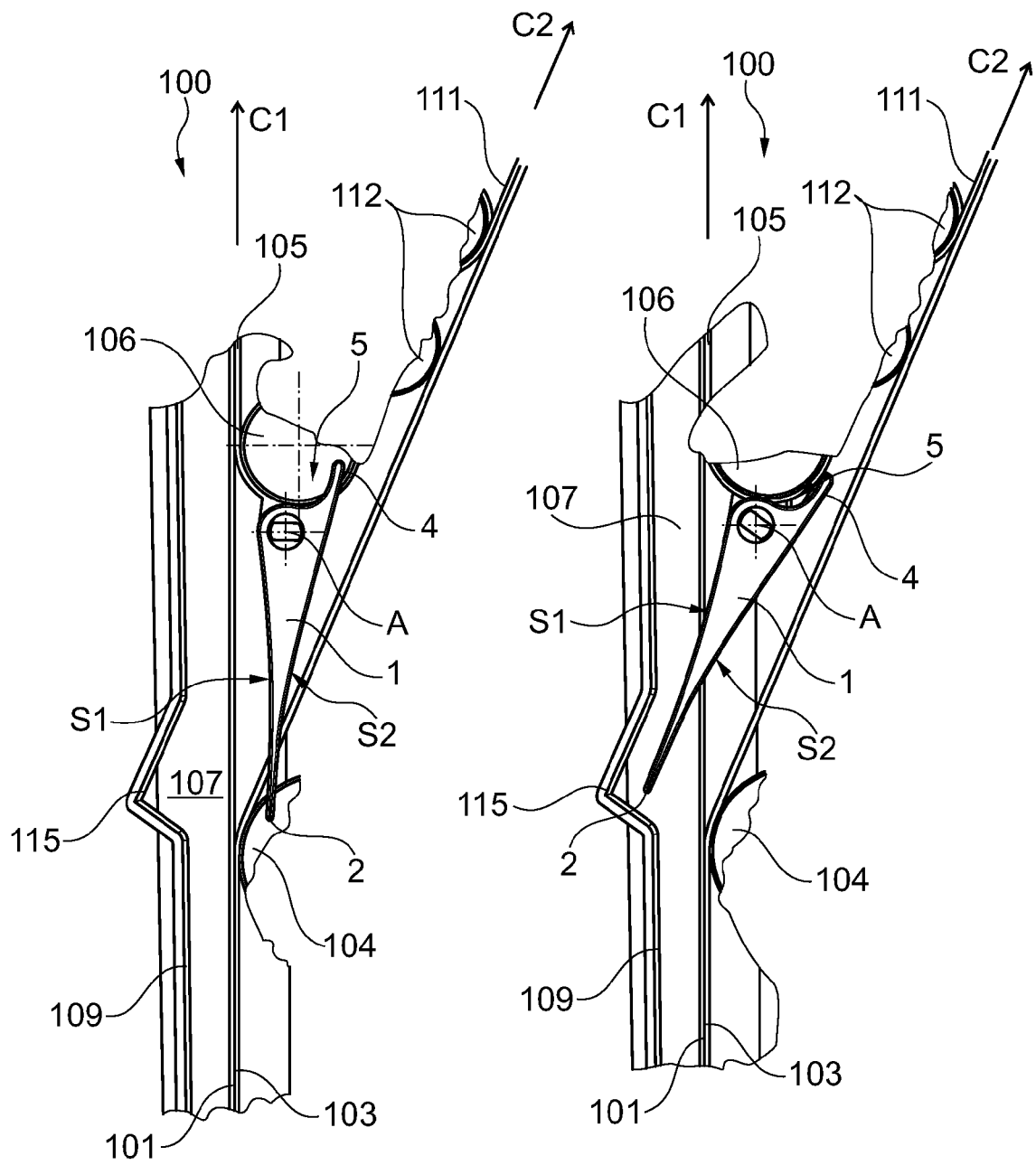
FIGS. 6 and 7 are fragmentary perspective views of the postal sorting machine of FIGS. 4 and 5, showing the separator flap respectively in its first position and in its second position, without any flat article traveling.

As appears clearly, in particular from FIGS. 6 and 7, the fact that the pivot rod 12 extends in the top portion only of the separator flap 1 enables the zone opposite from the pivot rod 12 under the vane to be left free so as to allow the foot belt 107 to pass through this zone. There is thus no risk of any interference between the pivot axis A and the foot belt 107, thereby making it possible to place the pivot axis A in the immediate vicinity of the main belt 101. The distance D1 between the foot belt 107 and the main belt 101 in a direction parallel to the pivot axis A is designed to be long enough to allow the prong 8 to go into the second position of the separator flap 1, as shown by FIG. 5. In addition, the special shape of the prong 8 of the separator flap 1 that is thinner at its free end than at its base, makes it possible to ensure that the prong can go into said second position without interfering either with the main belt 101 or with the foot belt 107. In addition, while the separator flap 1 is going from the first position to the second position, and while it is in its first position and in its second position, the specific shape of the notch 6, and in particular the first and second slide surfaces S3, S4, make it possible to limit the risks of flat articles E jamming. In particular when the flat articles E are floppy, they tend to slump onto their edges, sometimes forming a crease that might become wedged in the notch 6 on going through the bifurcation. With the separator flap 1 of the invention, such a crease is guided by the slanting side 61 of the notch 6 and by its first slide face S3 or it second slide surface S4 so as to be redirected respectively along the second path C2 or along the first path C1, thereby enabling the crease to go through the bifurcation without jamming. The same advantages are also offered when the downstream bottom corner of the flat article E rises relative to its upstream bottom corner, the flat article E then no longer bearing over its entire edge. In this configuration, the downstream bottom corner of the flat article E is guided respectively by the first slide surface S3 and by the second slide surface S4, tending to press it against the foot belt 107 and to steer it along the second path C2 or along the first path C1.

It appears clearly from the description that the postal sorting machine including such a separator flap of the invention makes it possible to solve the problems posed, and in particular to guarantee that the flat articles are conveyed through the bifurcations towards the sorting outlets, while limiting the risks of the sorted flat articles jamming or being damaged. The special shape of the separator flap makes it possible to smooth any crease back towards the flat article and thus to prevent such a crease from becoming wedged at the bifurcation and from causing either a permanent crease in the flat article or a jam by wedging, thereby causing the sorting machine to stop. In addition, suspending the separator flap makes it possible to place its pivot axis in the immediate vicinity of the bifurcation and in particular above a foot belt receiving the edges of the flat articles and making the conveying more reliable. Finally, the special shape of the separator flap enables it, as it is pivoting, to be able to pass between the foot belt and a main belt against which the faces of the flat articles bear.

The invention claimed is:

1. A postal sorting machine for flat articles on edge, said machine comprising:
a frame carrying at least a first belt conveyor means suitable for conveying said flat articles along a first path,
at least one separator flap mounted to move about a pivot axis between a first position in which said separator flap does not interfere with said first path and a second position in which said separator flap intersects said first path so as to direct said flat articles along a second path,
said postal sorting machine being characterized in that said separator flap comprises a vane secured to or integral with a pivot rod, which pivot rod defines said pivot axis, and extends on one side of said separator flap only and is fastened to said frame so that said separator flap is suspended by said pivot rod while a zone under said pivot axis is left free to receive at least one belt of said first belt conveyor means so that said belt passes through said zone without any interference.

2. The postal sorting machine according to claim 1, wherein said separator flap is provided with at least one notch extending from a free edge of said separator flap that is opposite from said pivot axis towards said pivot axis and designed, when said separator flap is in at least one of said first and second positions, to receive at least one belt of said first belt conveyor means so that said belt passes through said notch without any friction.

3. The postal sorting machine according to claim 2, wherein said notch in the separator flap has at least one slanting side disposed facing said pivot axis and having an end that points towards the pivot rod further away from said pivot axis than an opposite end that points towards a side of said vane that is free of the pivot rod.

4. The postal sorting machine according to claim 3, wherein a midplane of said separator flap contains said pivot axis and said free edge of said separator flap, said slanting side is inclined relative to said pivot axis at an angle lying in the range 15° to 45°, and preferably substantially equal to 30°.

5. The postal sorting machine according to claim 4, wherein a transverse plane of said separator flap is substantially perpendicular to said midplane, said slanting side defines first and second slide surfaces that are disposed in a V-shaped configuration relative to each other, a tip of the V-shape pointing away from said pivot axis, said first and second slide surfaces being substantially plane and inclined relative to said midplane respectively at a first slide angle lying in the range b 10° to 50° and preferably substantially equal to 30°, and at a second slide angle lying in the range 20° to 55° and preferably substantially equal to 42°.

6. The postal sorting machine according to claim 2, wherein said notch in said separator flap is offset on said vane, along said free edge of said separator flap so as to define a blade and a prong separated by said notch, a free end of said prong extending beyond a free edge of said blade, and a outer edge of said prong that faces away from said notch being inclined at least in part at an angle relative to said pivot axis so that said prong thickens going from a free tip of said prong towards a base of said prong.

7. The postal sorting machine according to claim 1, wherein a midplane of said separator flap contains said pivot axis and said free edge of said separator flap, said vane is rectangular in overall shape, and in that, in a transverse plane that is substantially perpendicular to said midplane, said separator flap has a profile that is triangular in overall shape, tapering towards the free edge of said separator flap.

8. The postal sorting machine according to claim 6, wherein said first belt conveyor means comprise at least one main belt and a foot belt that are separated from each other, in a direction that is substantially parallel to said pivot axis, by a predetermined distance arranged to allow said prong to pass without any friction between said foot belt and said main belt while said separator flap is pivoting towards said second position.

9. The postal sorting machine according to claim 1, wherein said postal sorting machine being characterized in that said separator flap is provided with at least one through detection orifice allowing detection means to pass through that are suitable for detecting a jam of said flat articles behind said separator flap, at least when said separator flap is in said first position.

10. The postal sorting machine according to claim 1, wherein said postal sorting machine being characterized in that it further comprises a motor-drive means for driving said separator flap, which motor-drive means are carried by said frame.

11. A postal sorting machine for flat articles on edge, said machine comprising:
a frame carrying at least first belt conveyor means suitable for conveying said flat articles along a first path;
at least one separator flap mounted to move about a pivot axis between a first position in which said separator flap does not interfere with said first path and a second position in which said separator flap intersects said first path so as to direct said flat articles along a second path; and
said postal sorting machine being characterized in that said separator flap comprises a vane secured to or integral with a pivot rod, which pivot rod defines said pivot axis, and extends on one side of said separator flap only and is fastened to said frame so that said separator flap is suspended by said pivot rod while a zone under said separator flap is left free, wherein:
said separator flap is provided with at least one notch extending from a free edge of said separator flap that is opposite from said pivot axis towards said pivot axis and designed, when said separator flap is in at least one of said first and second positions, to receive at least one belt of said first belt conveyor means so that said belt passes through said notch without any friction, and
said notch in the separator flap has at least one slanting side disposed facing said pivot axis and having an end that points towards the pivot rod further away from said pivot axis than an opposite end that points towards a side of said vane that is free of the pivot rod.

12. The postal sorting machine according to claim 11, wherein a midplane of said separator flap contains said pivot axis and said free edge of said separator flap, said slanting side is inclined relative to said pivot axis at an angle lying in the range 15° to 45°, and preferably substantially equal to 30°.

13. The postal sorting machine according to claim 12, wherein a transverse plane of said separator flap is substantially perpendicular to said midplane, said slanting side defines first and second slide surfaces that are disposed in a V-shaped configuration relative to each other, a tip of the V-shape pointing away from said pivot axis, said first and second slide surfaces being substantially plane and inclined relative to said midplane respectively at a first slide angle lying in the range 10° to 50° and preferably substantially equal to 30°, and at a second slide angle lying in the range 20° to 55° and preferably substantially equal to 42°.

14. The postal sorting machine according to claim 11, wherein said notch in said separator flap is offset on said vane, along said free edge of said separator flap so as to define a blade and a prong separated by said notch, a free end of said prong extending beyond a free edge of said blade, and an outer edge of said prong that faces away from said notch being inclined at least in part at an angle relative to said pivot axis so that said prong thickens going from a free tip of said prong towards a base of said prong.

15. The postal sorting machine according to claim 11, wherein the midplane of said separator flap contains said pivot axis and said free edge of said separator flap, said vane is rectangular in overall shape, and in that, in a transverse plane that is substantially perpendicular to said midplane, said separator flap has a profile that is triangular in overall shape, tapering towards the free edge of said separator flap.

16. The postal sorting machine according to claim 14, wherein said first belt conveyor means comprise at least one main belt and a foot belt that are separated from each other, in a direction that is substantially parallel to said pivot axis, by a predetermined distance arranged to allow said prong to pass without any friction between said foot belt and said main belt while said separator flap is pivoting towards said second position.

* * * * *